United States Patent [19]
Gaughan

[11] 3,876,781
[45] Apr. 8, 1975

[54] PESTICIDAL UTILITY OF CERTAIN PHOSPHORUS-CONTAINING THIAZOLIDINES

[75] Inventor: Edmund J. Gaughan, Kensington, Calif.

[73] Assignee: Stauffer Chemical Company, New York, N.Y.

[22] Filed: Dec. 17, 1973

[21] Appl. No.: 425,359

Related U.S. Application Data

[60] Division of Ser. No. 300,943, Oct. 26, 1972, Pat. No. 3,803,312, which is a continuation-in-part of Ser. No. 705,017, Feb. 13, 1968, abandoned, which is a continuation-in-part of Ser. No. 673,993, Oct. 9, 1967, abandoned.

[52] U.S. Cl.................................... 424/200; 71/87
[51] Int. Cl............................................. A01n 9/36
[58] Field of Search......................... 424/200; 71/87

[56] References Cited
UNITED STATES PATENTS
3,442,904  5/1969  Middleton............................ 260/307
3,803,312  4/1974  Gaughan............................. 424/200

Primary Examiner—Albert T. Meyers
Assistant Examiner—Douglas W. Robinson
Attorney, Agent, or Firm—Harry A. Pacini; Daniel C. Block; Edwin H. Baker

[57] ABSTRACT

Method for controlling pests employing compounds corresponding to the formula

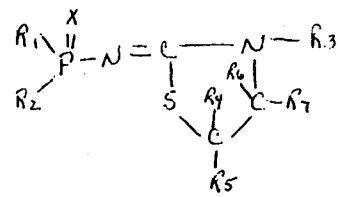

wherein X is oxygen or sulfur, $R_1$ is lower alkyl, lower alkoxy, or lower alkylthio; $R_2$ is lower alkyl, lower alkoxy, lower alkylthio, chloro lower alkyl, carbethoxy methylthio, allylthio, chlorophenylthio, nitrobenzyloxy, phenyl or substituted phenoxy in which said substituents are nitro, cyano, methylthio, chloro or tert.-butyl; $R_3$ is lower alkyl, benzyl, phenyl, lower alkoxyalkyl, alkenyl, chloroalkenyl or 2-propynyl; $R_4$ is hydrogen, lower alkyl, cyclohexyl or vinyl; $R_5$, $R_6$ and $R_7$ are independently hydrogen or lower alkyl.

13 Claims, No Drawings

PESTICIDAL UTILITY OF CERTAIN PHOSPHORUS-CONTAINING THIAZOLIDINES

This is a division of application Ser. No. 300,943, filed Oct. 26, 1972, now U.S. Pat. No. 3,803,312, which is a continuation-in-part of U.S. application Ser. No. 705,017, filed Feb. 13, 1968 now abandoned, which in turn is a continuation-in-part of U.S. application Ser. No. 673,993, filed Oct. 9, 1967 now abandoned.

The present invention is concerned with a novel group of phosphoryl, thionophosphoryl, phosphonyl, thionophosphonyl, phosphinyl and thionophosphinyl imino oxazolidines, thiazolidines and perhydrooxazines, their method of preparation, and their use as pesticides especially effective against insects, acarids and as herbicides.

The novel compounds are represented by the general formula

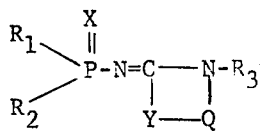

wherein X and Y are independently oxygen or sulfur; $R_1$ is lower alkyl, lower alkoxy, lower alkylthio phenyl; $R_2$ is lower alkyl, lower alkoxy, lower alkylthio, chloro lower alkyl, carbethoxymethylthio, allyl, chlorophenylthio, nitrobenzyloxy, phenyl or substituted phenoxy in which said substituents are nitro, cyano, methylthio, chloro or tert.-butyl; $R_3$ is lower alkyl, benzyl, phenyl, lower alkoxyalkyl, alkenyl, chloroalkenyl or 2-propynyl;

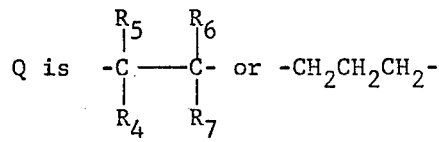

in which $R_4$ is hydrogen, lower alkyl, cyclohexyl or vinyl, $R_5$, $R_6$, and $R_7$ are independently hydrogen or lower alkyl. Provided that when Q is -CH$_2$CH$_2$CH$_2$- then $R_3$ is other than benzyl.

The lower alkyl radicals which are suitable for $R_1$, $R_2$, $R_3$, $R_4$, $R_5$, $R_6$ and $R_7$ are the straight and branched chain aliphatic radicals having from 1 to 6 carbon atoms and include, for example, methyl, ethyl, propyl, isopropyl, hexyl and the like. The lower alkoxy radicals for $R_1$ and $R_2$ contain from 1 to 6 carbon atoms; the lower alkylthio radical for $R_2$ contains from 1 to 6 carbon atoms; and the alkyl in chloro lower alkyl for $R_2$ contains from 1 to 3 carbon atoms. In the lower alkoxyalkyl radical for $R_3$, the alkoxy and alkyl portions thereof contain from 1 to 3 carbon atoms, for example, methoxyethyl, ethoxymethyl, ethoxyethyl, propoxypropyl and the like.

As a consequence of the special geometry of the compounds of this invention, the ring structure and restricted rotation within this structure, the possibility exists for geometric isomerism. Cis-trans isomerism is very frequently encountered in substituted ring structures of this type. It is recognized that the trans isomers are usually more stable than the corresponding cis isomers. Both stereoisomeric forms are believed to exist for the majority of the compounds described herein when possible. The compounds of the present invention are not limited to any specific geometric isomer configuration. In several instances, as seen below, both stereo isomers have been isolated and characterized. The physical properties of cis and trans isomers are usually quite similar and separation of both from a mixture by techniques such as fractional distillation or crystallization is not always possible. At the same time many of the compounds, due to the several possible asymmetric centers present in the molecule, have the possibility for optical stereoisomerism as well as the geometric isomerism, discussed above. This phenomenon is understood and recognized by those skilled in the art. The designations "D" and "L" found in Table 1 are used herein to indicate the configuration of the optically pure amino acids from which the compounds were made. No reference to the absolute or relative configurations of the final product is expressed or implied. To those skilled in the art, it is reasonable that such optical stereoisomerism is retained in the final product, and, therefore, the compounds prepared from optically pure starting materials will have a portion of their structures rich in the same absolute configuration.

The compounds herein described can be prepared by several various methods. In one general method, the oxazolidines of the present invention are prepared by reacting the appropriate organo substituted phosphorus chloride with an alkali metal thiocyanate using acetone or acetonitrile as solvent. The isothiocyanate thereby produced is then reacted with the appropriate beta-hydroxy amine to give a thio urea which in the presence of mercuric oxide undergoes cyclicization with the loss of the elements of hydrogen sulfide and yields the desired phosphoryl, thiophosphoryl, phosphonyl, thiophosphonyl, phosphinyl or thiophosphinyl imino oxazolidine. The desired product is isolated by thin layer chromatography using methods well known to those skilled in the art.

The necessary starting imino oxazolidines of the instant invention can be prepared by the general method which begins with the reaction between an epoxide and an appropriate primary amine to give the corresponding amino alcohol. The resulting amino alcohol is then allowed to react with cyanogen bromide in the presence of a caustic such as sodium hydroxide to yield the corresponding 2-imino-1,3-oxazolidine. The oxazolidine is then phosphorylated with an appropriate phosphoryl halide in the presence of sodium hydroxide. When a substituted phosphorothiono halidate is used as the phosphorylating agent, the product obtained is a phosphorothiono imino-1,3-oxazolidine. The resulting thiono compound can be rearranged to the thiolo isomer by reaction with an alkyl iodide. The resulting compound is then 2-[O,S(di-substituted phosphorothiolo)imino]-1,3-oxazolidine.

The preparation of phosphorodithio imino oxazolidines is readily accomplished by reacting the appropriate imino oxazolidine with a phosphorothiodichloridate to give a 2-[N(chloro-O-substituted-phosphorothiono)imino] oxazolidine. This intermediate is then reacted with a thiol-containing compound in the presence of caustic to yield the desired 2-[N-(O,S di-substituted phosphorodithio)imino]-1,3-oxazolidine.

The thiazolidines of the instant invention also are prepared according to the following general description of the synthetic procedure. Compounds of the form

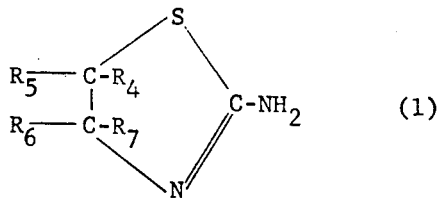

are treated with an appropriate $R_3$-halide in a polar solvent (e.g. methanol or ethanol) at room temperature or at elevated temperatures as required. Potassium iodide may be used as a catalyst for the less reactive halides. The products from this reaction have the general structure

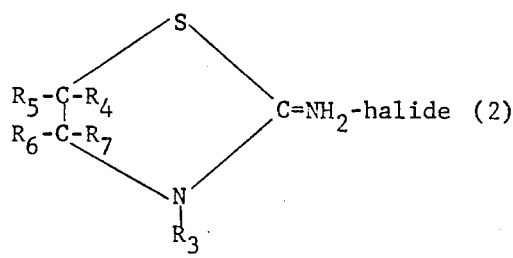

The free imino base

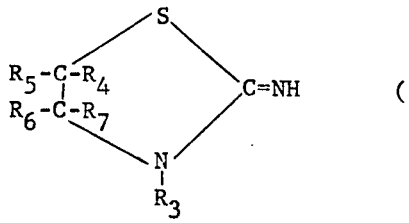

is obtained after dissolving the imino salt (2) in water and adding one equivalent, or more, of strong base (e.g. sodium hydroxide solution).

Either the imino salt (2) with two molar equivalents of base as acid acceptor or the free imine base (3) in molar excess or with one molar equivalent of another base is phosphorylated using an alkoxy chlorothionophosphate (-phosphonate) in an inert solvent. This reaction is exothermic and the reaction temperature is held below 45°C by cooling. Bases which can be used as acid acceptors are sodium hydroxide, potassium carbonate, potassium hydrogen carbonate or tertiary amines such as triethylamine. Suitable solvents are acetone, methylene chloride, benzene or heterogeneous mixtures such as benzene/water. The final product isolated has the general structure

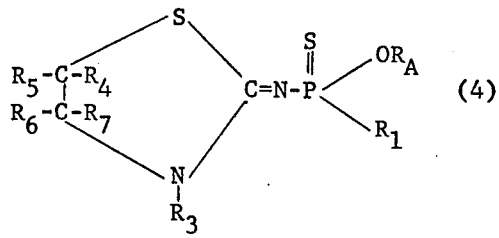

wherein $R_A$ is lower alkyl.

The thionophosphor (-phosphon) amides (4) are rearranged to thiolophosphor- (thiolophosphon-) amides (5) by dissolving them in an inert solvent (e.g. benzene, benzene/hexane) and refluxing with alkyl iodide (e.g. methyl iodide, ethyl iodide), or by refluxing them directly in the alkyl iodide. The products are purified by evaporating the solvent and alkyl iodide reagent, redissolving the crude product in a non-polar solvent such as benzene to precipitate the polar, solid by-product usually accompanying the rearrangement. The benzene solution is filtered and the solvent removed to give the final product which can be further purified by recystallization or chromatography. The products have the general thiolo structure (5).

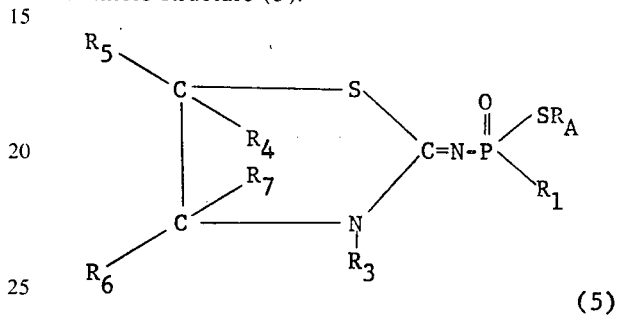

wherein $R_A$ is lower alkyl.

The preparation of the 1,3-perhydrooxazines is carried out by reacting an appropriate substituted amine with ethyl acrylate to produce a β-amino ester. The β-amino ester is reduced with lithium aluminum hydride to the 3-substituted-amino alkanol. The amino alkanol is reacted with cyanogen bromide (BrCN) in the presence of a base, such as powdered sodium hydroxide to yield the corresponding cyanamide. Treatment of the β-hydroxyalkyl cyanamide with a further quantity of sodium hydroxide promotes ring-closure to the corresponding imino perhydrooxazine. The imino perhydrooxazine is phosphorylated with the appropriate phosphorus containing acid chloride in a solution, such as benzene, in the presence of an acid acceptor such as sodium hydroxide. When a thiono phosphorus compound is prepared, rearrangement of the thiono to the thiolophosphorus compound is accomplished by reaction with an alkyl iodide in an appropriate solvent, such as benzene-hexane solution.

The following specific examples are illustrative of general methods discussed herein above.

EXAMPLE 1

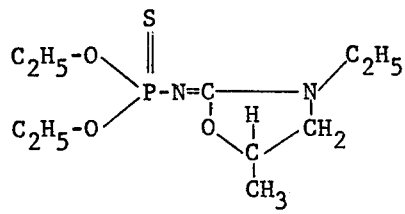

Preparation of 2-[N-(O,O-diethylphosphonothiono)-imino]-3-ethyl-5-methyl-1,3-oxazolidine To a solution of 38.8 grams (0.4 mole) of potassium thiocyanate in 395 ml. of acetone containing 6 grams of pyridine is added 75.4 grams (0.4 mole) of diethyl chlorothiophosphate over a 2 hour period. The mixture is stirred another hour at room temperature, than at 45°–50°C..for 45 minutes. It is filtered from the precip ate of potassium chloride and the solvent removed in vacuo. The residue is taken up in benzene and the insoluble material removed. The benzene is removed in vacuo and the product distilled twice, the second time through a Vigreux column. 5.3 grams (0.025 mole) of this product is dissolved in 42 ml. of benzene; 2.7g. (0.025 mole) of ethyl β-hydroxypropylamine in 10 ml. of benzene is added over 15 minutes. After letting the mixture stand overnight, the solvent is removed in vacuo leaving a crystalline product. To a solution of 3.3 grams (0.011 mole) of the above product in 50 ml. of benzene isadded 3.7 grams (0.0167 mole) of mercuric oxide. The mixture is stirred and refluxed for 3.5 hours. The mixture is filtered and the filtrate dried over magnesium sulfate. The benzene is removed in vacuo leaving a crude viscous product. This product is taken up in 35 ml. of benzene and refluxed with 2.0 grams of mercuric oxide for another five hours. The mixture is again filtered, dried and the solvent removed. Pure 2-[N-(O, O-Diethyl-phosphonothiono)-imino]-3-ethyl-5-methyl-1,3-oxazolidine is isolated from the crude product by thin layer chromatography, using solvent systems 90:10 chloroform:acetone v/v on silica gel. Instrumental analysis establishes the above structure and elemental analysis shows 43.18% C, 7.53% H, 9.82% N, 11.23% P, and 11.27% S as compared with theoretical values of 43.20% C, 7.55% H, 10.00% N, 11.10% P and 11.40% S.

Another general method for the preparation of the O,S-phosphorylimino oxazolidines of the present invention consists of reacting the product resulting from the reaction of the appropriate O,O-phosphorodithioic acid and cyanogen bromide in the presence of triethylamine with the appropriate beta-hydroxyamine and isolating the desired product by thin layer chromatography using methods well known to those skilled in the art. The following example is illustrative of the above general method.

EXAMPLE 2

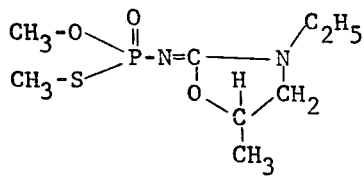

Preparation of
2-[N-(O,S-Dimethylphosphonothiolo)-imino]-3-ethyl-5-methyl-1,3-oxazolidine To a solution of 79.0 grams (0.5 mole) of O,O-dimethylphosphonodithioic acid in 100 ml. of benzene is added 50.5 grams (0.5 mole) of triethylamine at 15° to 25°C. A solution of 53 grams (0.5 mole) of cyanogen bromide in 75 ml. of benzene is then added over 1.5 hours at 15°C. The reaction mixture is then stirred two more hours at room temperature, during which time the precipitate of amine hydrobromide becomes thicker. The mixture is filtered and the benzene removed from the filtrate in vacuo. The product is distilled at 55°-58°C./0.75–1.0 mm. yielding 44.0 grams. 5.5 grams of this intermediate product is dissolved in 44 ml. of dry acetone and to the solution is added a solution of 3.1 grams of ethyl β-hydroxypropylamine in 15 ml. of acetone. The mixture warms to 32° during addition and is stirred for 1.5 hours. The acetone is removed in vacuo and the residue pumped out at 0.4 mm. for 1.5 hours, yielding 8 grams. Upon standing, the product partially crystallizes. After the crystals are removed, the mixture is placed in 30 ml. of water and the mixture is extracted twice with 80 ml. portions of chloroform. The extract is dried over magnesium sulfate, filtered, and the solvent removed in vacuo. The residual oil is pumped out at 1 mm. up to 55°C. It is then seeded with one of the spontaneously formed crystals removed above and allowed to stand until all of the second component has crystallized out. The mixture is then filtered and the oily filtrate subjected to thin layer chromatography using 90:10 chloroform:acetone v/v and 95:5 ethanol:water v/v solvent systems on silica gel, giving pure 2-[N-(O,S-dimethylphosphonothiolo)-imino]-3-ethyl-5-methyl-1,3-oxazolidine. Instrumental analysis establishes the above structure and elemental analysis shows 12.30% P compared to 12.30% P theoretical.

Another general method for the preparation of the O,S-phosphoryl imino oxazolidines of the present invention consists of reacting the appropriate O,O-thiophosphonylimino oxazolidine with the appropriate alkyl or alkenyl iodide to form the desired product, which is isolated by thin layer chromatography using methods well known to those skilled in the art. The following example is illustrative of the above general method.

EXAMPLE 3

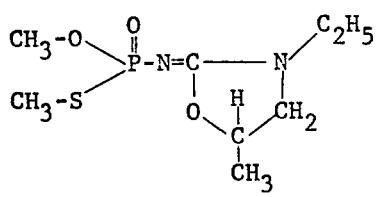

Preparation of 2[-3-ethyl-5-methyl-1,3-oxazolidine

A solution of 7.6g. (0.03 mole) of 2-[N-(O,O-dimethylphosphonothiono)-imino]-3-ethyl-5-methyl-1,3-oxazolidine and 4.4g. (0.031 mole) of methyl iodide in a mixture of 25 ml. of hexane and 5 ml. of benzene is refluxed for 5 hours. The mixture is cooled and filtered and the solvent removed in vacuo.

EXAMPLE 4

Preparation of
Diethylthiophosphinoisothiocyanatothioate

Potassium thiocyanate (65.6 g., 0.75 mole) and a trace of potassium iodide are placed in 500 ml. of dry acetone and warmed to 45°. Diethylthiophosphinochloridothioate (78.3 g., 0.5 mole) is added dropwise at 45°–50°. A precipitate of potassium chloride appeared. The mixture is then refluxed for 15 minutes. It is cooled, filtered, and the solvent removed in vacuo. The residue is treated with water and the oil extracted with hexane. The extract is washed with sodium bicarbonate solution and with water, dried, and the solvent removed in vacuo. The residue is distilled twice in vacuo. The product has a boiling point of 79°–80°/.3 mm. Yield: 49.0 g. (55% of theory). Its IR spectrum showed a band characteristic of the isothiocyanate group at 2000–2050 $cm^{-1}$.

Preparation of
N-Diethylthiophosphinyl-N'-Methyl-N'-hydroxyethyl thiourea

The above-mentioned thioate (26.9 g., 0.15 mole) is dissolved in 75 ml. of benzene and a solution of N- methylethanolamine (12.0 g., 0.16 mole) added dropwise. The temperature increased to 33° during the addition. Stirring is continued 1 hour at room temperature, 1 hour at 65°–70°. The reaction mixture is filtered through Celite and evaporated in vacuo. Upon trituation with hexane, the residue solidified. It is recrystallized from benzene-hexane, and has a m.p. 68°–73°. Yield: 23.4 g. (61% of theory).

Preparation of
2-(Diethylthiophosphinoimino)-3-methyl oxazolidine

The above-mentioned thiourea (15.6 g., 0.07 mole) dissolved in 150 ml. of benzene is stirred and refluxed with mercuric oxide (32.6 g., 0.15 mole) under a Dean-Stark trap until nor more water is given off (about 3 hours). Black mercuric sulfide appears. The mixture is cooled, filtered, and the filtrate dried over magnesium sulfate. Removal of the solvent left a yellow oil. $n_D^{30}$=1.5563. Yield: 7.8 g. (51% of theory).

EXAMPLE 5

Preparation of the Intermediate
2-Imino-3-ethyl-5-methyl-1,3-oxazolidine

Ethylaminoisopropanol (20.6 g., 0.2 mole) is dissolved in 90 ml. of benzene and powdered sodium hydroxide (8.0g., 0.2 mole) added. This mixture is stirred and a solution of cyanogen bromide (21.2 g., 0.2 mole) in 50 ml. of benzene added at 5°–15°C. A precipitate of sodium bromide appeared. The mixture is stirred two hours at room temperature, filtered and the solvent removed in vacuo. The residue is distilled through a Vigreux column b.p. 57°–59°/2 mm. There is obtained a yield of 17.7 g. (69.1%) of the title compound. The IR spectrum showed the expected bands.

Preparation of
2-(O,O-dimethylthionophosphorylimino)-3-ethyl-5-methyl-1,3-oxazolidine Dimethyl chlorothiophosphate (16.1 g., 0.1 mole) is added dropwise at 20°–25° to a well stirred mixture of the iminooxazolidine (13.4 g., 0.105 mole) and sodium hydroxide (4.1 g., 0.105 mole) in 100 ml. of benzene and 25 ml. of water. The mixture is stirred another four hours, the layers separated, and the organic layer is washed and dried. Removal of the solvent left a crystalline residue which is recrystallized from ether, m.p. 68°–71°. There is obtained a yield of 18.0 g. (71.4%) of the title compound. The IR spectrum showed the expected bands. The structure was also confirmed by its NMR spectrum.

Preparation of
2-(O,S-dimethylthiolophosphorylimino)-3-ethyl-5-methyl-1,3-oxazolidine The thiono compound (200 g., 0.79 mole) and methyl iodide (124.1 g., 0.87 mole) are refluxed in a mixture of 396 ml. of benzene and 598 ml. of hexane for three hours. The solvent is removed in vacuo and about one liter of dry benzene is added to the residue. The mixture is allowed to stand over night and filtered through diatomaceous earth filteraid. The benzene is removed in vacuo and the residue, a viscous yellow oil, pumped out under high vacuum. There is obtained a yield of 188.4 g. (94.2%). IR and NMR spectra confirmed the assigned structure. The product was about 80% pure by quantitative T.L.C. A chromatographically pure sample isolated by preparative T.L.C. showed $n_d^{30}$ 1.5172.

EXAMPLE 6

Preparation of the Intermediate:
2-Imino-3-methylthiazolidine hydrogen iodide

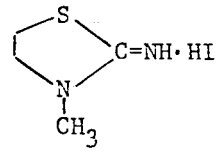

In a 1-liter round bottom flask containing a magnetic stirring bar is dissolved 110 g. (1.08 moles) 2-amino-2-thiazoline in 230 ml. absolute methanol. To this solution are then added 153 g. (1.08 moles) methyl iodide. The temperature of the exothermic reaction was held below the boiling point by immersing the flask in a cold water bath. Stirring at room temperature is continued over approximately a 70 hour period. Within this period, a copious amount of solid precipitates. The reaction mixture is cooled in the refrigerator and the solid filtered. Concentration of the filtrate gives an additional crop of product. After drying, a total of 220.9 g. of crude product is isolated, m.p. 149°–159°C. Recrystallization of this material gives 207.6 g. of long, colorless needles, m.p. 160.5°–162°C. Yield: 79% of theory. (Literature, m.p. 159°–160°, S. Gabriel, Ber. 22, 1146 (1889).

Preparation of the Intermediate:
2-Imino-3-methylthiazolioline

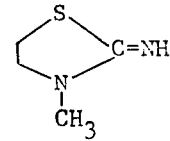

The free imine is obtained by mixing 66.9 g. (0.274 moles) 2-imino-3-methylthiazolidine hydrogen iodide with 30 ml. water and adding, with cooling in an ice bath, 40 ml. of 25% (w/w) sodium hydroxide solution. A pH of about 10 is reached. The resulting solution is extracted continuously with benzene for two days using a liquid-liquid extraction apparatus. The benzene solution is dried over anhydrous magnesium sulfate, filtered and the benzene is evaporated. The residue is distilled through a 10 cm. Vigreaux column. There is collected 21.2 g. of product, bp. 96°–96.5°C/4.1 torr. Yield: 67% of theory. [Literature: bp. 119°–120°C/20 torr., K.K. Kuz'mina, et al., Zh. Obshch. Khim., 32, 3215 (1962.)]

EXAMPLE 7

2-(O,O-Dimethylthiophosphorylimino)-3-methylthiazolidine

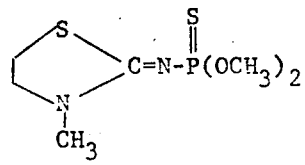

Into a 500 ml. four-neck round bottom flask provided with stirrer, thermometer and pressure equalizing funnel are placed 16.9 g. (0.0694 moles) 2-imino-3-methylthiazolidine hydrogen iodide, 100 ml. benzene and 22.2 g. (0.139 equivalents) of 25% (w/w) sodium hydroxide solution. This heterogeneous mixture is stirred vigorously as 11.2 g. (0.0694 moles) O,O-dimethyl chlorothiophosphate dissolved in 30 ml. benzene are added dropwise. The reaction temperature rose slowly but did not exceed 30°C. After the addition of chlorothiophosphate, stirring at room temperature is continued for an additional 2 hours. The benzene layer is separated and the aqueous layer is extracted thrice with 20 ml. portions of benzene. The combined benzene fractions are dried over anhydrous magnesium sulfate, filtered and the benzene is evaporated. The residual solid is recrystallized from petroleum ether/benzene to yield 13.9 g. of colorless crystals, m.p. 89°–93°C. Yield: 83% of theory. On further recrystallization, the melting point could be raised to 90°–92.5°C.

Anal. calc'd. for $C_6H_{13}N_2O_2PS_2$: C, 29.99; H, 5.45; N, 11.66; S, 26.69. Found: C, 29.54; H, 5.53; N, 11.61, S, 26.51.

The infrared spectrum (KBr pellet) showed a strong band at 1590 cm$^{-1}$ (C=N—vibration), and strong bands at 1040 cm$^{-1}$, 1020 cm$^{-1}$ and at 780 cm$^{-1}$ (P—O—C stretch).

EXAMPLE 8

2-(O,O-Dimethylthiophosphorylimino)-3-methylthiazolidine

A solution of 9.5 g. (0.082 moles) 2-imino-3-methylthiazolidine in 100 ml. benzene is treated with 13.1 g. (0.082 equivalents) 25% (w/w) sodium hydroxide solution. To the resulting mixture are added slowly 13.1 g. (0.082 moles) O,O-dimethyl chlorothiophosphate in 30 ml. benzene. The reaction temperature is held below 30°C with the aid of a water bath. After drying the benzene layer and then evaporating the solvent, a colorless solid remained. Recrystallization from petroleum ether/benzene gave 15.8 g., m.p. 88°–91°C. Yield: 80% of theory. The infrared spectrum of this material is identical to the spectrum obtained from the procedure in Example 7, supra.

EXAMPLE 9

2-(O,S-Dimethylthiophosphorylimino)-3-methylthiazolidine

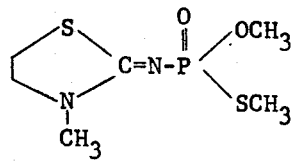

A mixture of 120.5 g. (0.500 moles) 2-(O,O-dimethylthiophosphorylimino)-3-methylthiazolidine, 400 ml. benzene and 213 g. (1.50 moles) methyl iodide are refluxed for 80 minutes. Most of the methyl iodide and benzene are evaporated. The remaining pale yellow liquid is redissolved in 500 ml. benzene and allowed to remain in contact overnight. A small amount of colorless solid by-product precipitated during this period. The benzene solution is filtered and the solvent evaporated. Some 113.5 g. of a viscous, colorless oil remained. Yield: 94% theory.

Anal. calc'd for $C_6H_{13}N_2O_2PS_2$: C, 29.99; H, 5.45; N, 11.66; mol. wt., 240.29. Found: C, 29.63; H, 5.76; N, 11.62; mole wt. (mass spectroscopy), 240 (based upon $^{32}$S).

The infrared spectrum of this compound (liquid film) showed a strong band at 1590 cm$^{-1}$ (C=N— vibration), a band at 1210 cm$^{-1}$ (P=O), and bands at 1040 cm$^{-1}$ and 780 cm$^{-1}$ (P—O—C stretch).

EXAMPLE 10

Preparation of the Intermediate 2-[N-(chloro-O-ethylphosphorothiono)-imino]-3-ethyl-5-methyl-1,3-oxazolidine 44.5 g. of phosphorothiodichloridate is dissolved in 300 ml. of anhydrous ethyl ether. To this mixture a solution of 64.0 g. 2-imino-3-ethyl-5-methyl-1,3-oxazolidine in 400 ml. anhydrous ethyl ether is added dropwise at −10°C. The reaction mixture is stirred at room temperature for two hours. After filtering the solvent is removed on a rotary evaporator. There is obtained 67.0 g. (Yield: 95% of theory) $n_D^{30}$ 1.5245.

Preparation of 2-[N-(O,S-Diethyl phosphorodithio)-imino]-3-ethyl-5-methyl-1,3-oxazolidine A solution of 11.0 g. 2-[N-(chloro-O-ethylphosphorothiono)-imino]-3-ethyl-5-methyl-1,3-oxazolidine in 50 ml. tetrahydrofuran was added to 3.1 g. of ethanethiol and 2.0 g. of powdered sodium hydroxide in 100 ml. tetrahydrofuran at room temperature. The mixture is stirred for two hours at 50°C. The solution is dried with anhydrous MgSO$_4$, filtered and the solvent removed on a rotary evaporator. There is obtained 11.0 g. (Yield: 92% of theory) of the title compound, $n_D^{30}$ 1.5139.

EXAMPLE 11

Preparation of 2-N-[O-ethyl-S-(4-chlorophenyl)phosphorodithiono]-imino-3-ethyl-5-methyl-1,3-oxazolidine A solution of 11.0 g. 2-[N-(chloro-O-ethylphosphorothiono)-imino]-3-ethyl-5-methyl-1,3-oxazolidine in 50 ml. of tetrahydrofuran is added to 7.2 g. p-chlorothiophenol and 2.0 g. powdered NaOH in 100 ml. tetrahydrofuran. The mixture is stirred for two hours at 50°C. The reaction mixture is dissolved in ethyl ether and washed twice with 100 ml. of 10% NaOH solution and once with 100 ml. of water. The ether layer is then dried over anhydrous MgSO$_4$ and the solvent removed on rotary evaporator. There is obtained 14.7 g. (Yield: 94% of theory) of the title compound $n_D^{30}$ 1.5753.

2-[N-(chloro-S-methylphosphorothio)-imino]-3-ethyl-5-methyl-1,3-oxazolidine is prepared in the same manner as described for 2-[N-(chloro-O-ethyl phosphorothio)-imino]-3-ethyl-5-methyl-1,3-oxazolidine starting with S-methyl thiophosphorodichloridate.

EXAMPLE 12

Preparation of 2-[N-(S-allyl,S-methyl phosphorodithio) imino]-3-ethyl-5-methyl-1,3-oxazolidine.

A solution of 15.3 g. 2-[N(chloro-S-methylphosphorothio)-imino]-3-ethyl-5-methyl-1,3-oxazolidine in 50 ml. tetrahydrofuran is added to 4.5 g. allyl thiol and 2.4 g. powdered sodium hydroxide in 100 ml. tetrahydrofuran. The mixture is stirred for 2 hours at 50°C. The mixture is dissolved in benzene and washed once with 100 ml. saturated solution of NaHCO$_3$ and twice with 100 ml. water. The organic layer is dried over anhydrous MgSO$_4$ and the solvent removed on rotary evaporator. There is obtained 9.1 g. (Yield: 52% of theory) of the title compound, $n_D^{30}$ 1.5607.

It is noted that when optically pure materials are used to prepare compounds within the scope of this invention, a variation in insecticidal activity is observed. The preparation of such compounds, believed to be rich in one optical isomer due to retention of configuration throughout the synthesis, is carried out by starting with an appropriate optically pure amino acid such as D- or L-alanine. The amino acid is then acylated with an appropriate acylating agent such as acetic anhydride to yield an N-acyl amino acid which is then reduced with lithium aluminum hydride to give a 2-substituted-amino alkanol. The amino alkanol is reacted with cyanogen bromide (BrCN) in the presence of a base, such as powdered sodium hydroxide to yield the corresponding cyanamide. Treatment of the β-hydroxyalkyl cyanamide with a further quantity of sodium hydroxide promotes the ring-closure to the corresponding imino oxazolidine. The imino oxazolidine is phosphorylated with the appropriate phosphorus containing acid chloride in a solution, such as benzene, in the presence of an acid acceptor such as sodium hydroxide. When a thionophosphorus compound is prepared, rearrangement to the thiolophosphorus compound is accomplished by reaction with an alkyl iodide in an appropriate solvent, such as benzene-hexane solution.

The above general procedure is illustrated by the following specific preparations:

EXAMPLE 13

Preparation of the Intermediate: N-Acetyl-D-Alanine

D-Alanine (25.0 g., 0.281 moles) is added to 100 ml. of water and then cooled in an ice bath while being rapidly stirred. Potassium hydroxide (18.5 g. of 85% KOH) in 50 ml. of water is added slowly, resulting in a clear solution. To this solution 28.6 g. of acetic anhydride is added with vigorous stirring, and the mixture stirred for 1 hour at room temperature. The resulting clear solution is acidified with 23.4 ml. of concentrated hydrochloric acid, poured into an evaporating dish, and the solvent allowed to evaporate. The concentrate is placed on a rotary evaporator and further concentrated until a viscous semi-solid is obtained which is then thoroughly titurated with ethyl acetate. The ethyl acetate is decanted and dried over anhydrous sodium sulfate, filtered to remove solids, and stripped on a rotary evaporator to give a colorless oil which slowly crystallizes. A total of 35.4 g. (96%) of crude product is obtained which is used without further purification.

Preparation of the Intermediate: N-Ethyl-D-Alaninol

N-Acetyl-D-Alanine (35.4 g., 0.270 mole) is dissolved in 350 ml. of dry tetrahydrofuran and 63 ml. of 4.2M lithium aluminum hydride in ether added dropwise with rapid stirring at a rate such that the solvent refluxes gently. After addition is complete, refluxing with rapid stirring is continued for 3 hours. After cooling the stirred mixture in an ice bath, 20 ml. of water is added dropwise, followed by 20 ml. of 25% aqueous potassium hydroxide solution, and 40 ml. of water. The precipitated solids are removed by filtration, washed with tetrahydrofuran, percolated with hot ethanol, and again filtered. The combined filtrates are dried over anhydrous sodium sulfate, and stripped of solvent. The oily residue is shaken with tetrahydrofuran and the supernatant liquid decanted, filtered, and stripped of solvent. There is obtained a yield of 15.8 g. (64%) of an amber oil.

Preparation of the Intermediate: "D"
2-Imino-3-ethyl-4-methyl-1,3-oxazolidine

N-Ethyl-D-alaninol (17.6 g., 0.171 mole) prepared by the above-described method is dissolved in 75 ml. of benzene. Powdered sodium hydroxide (7.1 g.) is added and rapid stirring begun. A solution of 18.1 g. of cyanogen bromide dissolved in 50 ml. of benzene is added dropwise to the above mixture which has been cooled in an ice bath. After the addition of cyanogen bromide is complete, another 1 g. of powdered sodium hydroxide is added and the whole stirred for 2 hours at room temperature. The solids are removed by filtration and the solvent removed by a rotary evaporator. There is obtained a yield of 19.0 g. (87%) of a wine-red oil which is vacuum flash distilled into a dry ice trap using a hot water bath (85°).

EXAMPLE 14

Preparation of "D"
2-[N-(O,O-Dimethylphosphorothiono)-imino]-3-ethyl-4-methyl-1,3-oxazolidine The above oxazolidine (11.5 g., 0.0898 mole) is dissolved in 100 ml. of benzene and 3.7 g. of powdered sodium hydroxide added. O,O-Dimethyl phosphorothionochloridate (14.5 g., 0.898 mole) is dissolved in 25 ml. of benzene and is added to the above rapidly stirred mixture. The temperature is kept below 45° by use of a water bath. After stirring for ½ hour at room temperature another 1 g. of powdered sodium hydroxide is added and the whole stirred for another 2 hours at room temperature. At the end of this time, water is added to the reaction mixture, the benzene layer separated and the aqueous phase is washed with benzene. The combined organic layers are washed with water, saturated sodium chloride solution, and dried over anhydrous sodium sulfate. The solvent is removed by evaporation to yield 15.4 g. (68%) of an amber oil which crystallizes on standing overnight.

EXAMPLE 15

Preparation of 2-[N-(O,S-Dimethyl Phosphorothiolo)-imino]-3-ethyl-4-methyl-1,3-oxazolidine The thiono compound (8 g.) prepared by the above procedure in Example 13 is dissolved in 50 ml. of benzene, 5 ml. of methyl iodide added, and the solution refluxed for 1 hour. The solution is cooled and the solvent removed on a rotary evaporator to yield an amber oil $n_D^{30}$ 1.5265.

GENERAL PROCEDURE

In general, the synthesis of compounds of the type

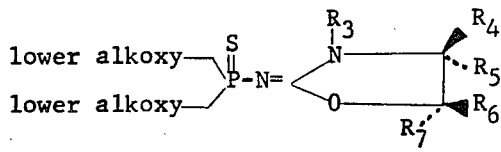

and

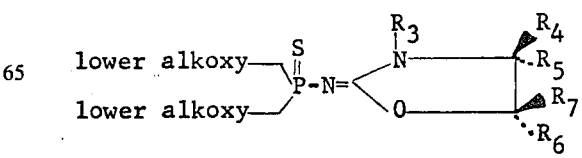

begins by reacting a geometrically pure cis or trans isomer of a symmetrical epoxide with an appropriate primary amine to give either a threo or erythro-β-aminoalcohol. The resulting β-aminoalcohol is then allowed to react with cyanogen bromide in the presence of sodium hydroxide, to give a trans or cis-4,6-disubstituted 2-imino-1,3-oxazolidine. The oxazolidine is then phosphorylated with an appropriate phosphoryl halide in the presence of sodium hydroxide. The following example is illustrative of the above general method.

EXAMPLE 16

Erythro-1 methyl 2-ethylamino propanol

To 64.3 g. of a stirred 70% aqueous solution of ethylamine is added dropwise 36.0 g. of trans-2-butene oxide. The solution is allowed to stir overnight at room temperature, then at 34°–45° for approximately 7 hours, then again overnight at room temperature.

The resulting solution is then placed briefly on a rotary evaporator at 35° to remove unreacted ethylamine and epoxide. Ether (300 ml.) is then added and the two phase system rapidly stirred with anhydrous sodium sulfate. The ether layer is decanted and dried over anhydrous magnesium sulfate. The ether is removed on a rotary evaporator leaving 14.1 g. of a colorless liquid.

2-Imino-3-ethyl-cis-4,5-dimethyl-1,3-oxazolidine

To 13.6 g. of the above amino alcohol in 75 ml. of benzene is added 4.8 g. of powdered sodium hydroxide. The mixture is cooled in an ice bath and stirred rapidly during the dropwise addition of 12.3 g. of cyanogen bromide in 50 ml. of benzene. After the addition of 12.3 g. of cyanogen bromide is complete another 1.0 g. of powdered sodium hydroxide is added and the mixture stirred for 2 hours at room temperature. The mixture is filtered to remove solids and the solvent removed on a rotary evaporator to give 15.2 g. of a slightly brown mobile liquid.

2-[N-(O,O-dimethylphosphorothioro)-imino]0,0-3-ethyl cis-4,5-dimethyl-1,3-oxazolidine To 14.8 g. of the above oxazolidine in 75 ml. benzene is added 4.2 g. of powdered sodium hydroxide. The mixture is stirred rapidly and a solution of 16.8 g. of O,-O-dimethylphosphorothionochloridate in 25 ml. of benzene is added dropwise such that the temperature did not exceed 45°. After addition of the chloridate is complete, another 0.5 g. of powdered sodium hydroxide is added and the mixture stirred for a total of 2½ hours. The solids are removed by filtration and the solution dried over anhydrous magnesium sulfate. The solvent is removed on a rotary evaporator to give 26.1 g. of the title compound a light amber oil.

GENERAL PROCEDURE

The compounds of the formula

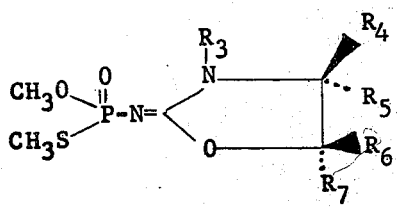

and

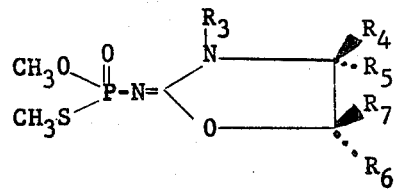

are readily prepared by refluxing the corresponding thiono compounds with methyl iodide in benzene. The following example is illustrative of this general method.

EXAMPLE 17

2-[N-(O,S-dimethylphosphorothiolo)-imino]-3-ethyl-cis-4,5-dimethyl-1,3-oxazolidine 2-[N-(O,O-dimethylphosphorothiono)]-3-ethyl-cis-4,5-dimethyl-1,3-oxazolidine (19.3 g.) is dissolved in 75 ml. of benzene, 10 ml. of methyl iodide added and the whole refluxed for 1 hour. At the end of this time the solution is filtered to remove a small amount of solid and the solvent removed on a rotary evaporator to give the title compound a reddish amber oil.

EXAMPLE 18

Preparation of
2-Imino-3-iso-propylperhydro-1,3-oxazine

Preparation of the Intermediate: Ethyl
β-isopropylamino propionate

To isopropylamine (63.3 g., 1.07 mole) in 300 ml. of ethanol is added ethyl acrylate (110 g., 1.1 mole) at 40°–50° with stirring. The mixture is kept at steam bath temperature for one hour. The solvent is removed through a Vigreux column in vacuo and the residue is distilled. There is obtained a yield of 154.2 g. 91% of theory of the intermediate b.p. 68.5°–70°/6.4 mm. The IR spectrum showed the expected bands.

Preparation of the Intermediate:
Isopropylamino-3-propanol

To 120 ml. of a 4.2 molar solution of lithium aluminum hydride (19 g., .5 mole) in ether is added 100 ml. additional dry ether. A solution of ethyl β-isopropylaminopropionate (95.4 g., .6 mole) in 50 ml. of dry ether is added dropwise at 15°–25°. The mixture is stirred for ½ hour at room temperature and refluxed for 1 hour. Nineteen milliliters of water are slowly added to the mixture with stirring and cooling, followed by 19 ml. of 15% sodium hydroxide solution and an additional 57 ml. of water. The mixture is stirred a few minutes, filtered, and the filter-cake extracted with ether. The ether solution is dried over magnesium sulfate and stripped in vacuo, and the residue is distilled. There is obtained a yield of 43.5 g. (74.4%) b.p. 61.5°–63°/2.6 mm. theory. The IR spectrum confirmed the structure.

The above amino alcohol (35.1 g., 0.3 mole) and powdered sodium hydroxide (12.0 g., 0.3 mole) are placed in 200 ml. of dry benzene. A solution of cyanogen bromide (30.9 g., 0.3 mole) in 100 ml. of dry benzene is added with stirring at 5°–15°. The mixture is then stirred one hour at ice-bath temperature and two hours at room temperature. The mixture is filtered, the filtrate treated with MgSO$_4$, and refiltered, and the solvent is removed in vacuo. The residue (43.8 g.) showed a strong C ≡ N band at 2200 cm$^{-1}$ in the infrared. This product is mainly the uncyclized cyanamide.

38.8 g. of the uncyclized cyanamide is dissolved in 400 ml. of benzene, 6.0 g. of powdered caustic added and the mixture stirred for five hours. Some heat is evolved. Removal of the solvent left an oil. This is distilled twice in vacuo, the second time through a Vigreux column. The product is collected at 48°–50°/.35 mm. No C≡N band was observed in the infrared spectrum. There is obtained a yield of 17 g. (43.8% based on the cyanamide), of the title perhydro-1,3-oxazine. in an The other perhydro-1,3-oxazines described herein are prepared in analogous manner starting with the appropriate materials as outlined herein above.

The following is a table of compounds representative of those embodied in the present invention. Compound numbers have been assigned to them and are used for identification throughout the balance of the specification.

TABLE I 1A wherein Q is 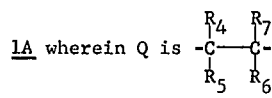      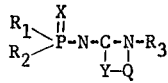

| Compound Number | X | Y | $R_1$ | $R_2$ | $R_3$ | $R_4$ | $R_5$ | $R_6$ | $R_7$ | $n_D^{30}$ or melting point °C |
|---|---|---|---|---|---|---|---|---|---|---|
| 1 | 0 | 0 | $CH_3O$ | $CH_3S$ | $C_2H_5$ | $CH_3$ | H | H | H | Yellow oil |
| 2 | 0 | 0 | $C_2H_5$ | $CH_3S$ | $C_2H_5$ | $CH_3$ | H | H | H | Yellow oil |
| 3 | 0 | 0 | $C_2H_5O$ | $CH_3S$ | $C_2H_5$ | $CH_3$ | H | H | H | Yellow oil |
| 4 | 0 | 0 | $CH_3O$ | $CH_3S$ | $C_2H_5$ | H | H | H | H | Yellow oil |
| 5 | S | 0 | $CH_3O$ | $CH_3O$ | $C_2H_5$ | H | H | H | H | 54-57 |
| 6 | S | 0 | $CH_3O$ | $CH_3O$ | $C_2H_5$ | $C_2H_5$ | H | H | H | 1.5175 |
| 7 | 0 | 0 | $CH_3O$ | $CH_3S$ | $C_2H_5$ | $C_2H_5$ | H | H | H | Red brown oil |
| 8 | 0 | 0 | $C_2H_5$ | $CH_3S$ | $CH_3OC_2H_4$ | $CH_3$ | H | H | H | Dark red oil |
| 9 | S | 0 | $C_2H_5$ | $C_2H_5O$ | $CH_3OC_2H_4$ | $CH_3$ | H | H | H | 1.5078 |
| 10 | 0 | 0 | $CH_3O$ | $CH_3S$ | $CH_2CH=CH_2$ | $CH_3$ | H | H | H | Yellow oil |
| 11 | S | 0 | $CH_3O$ | $CH_3O$ | $i-C_4H_9$ | $CH_3$ | H | H | H | 1.5109 |
| 12 | 0 | 0 | $CH_3O$ | $CH_3S$ | $i-C_4H_9$ | $CH_3$ | H | H | H | Yellow oil |
| 13 | 0 | 0 | $CH_3O$ | $CH_3S$ | $CH_3OC_2H_4$ | $CH_3$ | H | H | H | Yellow oil |
| 14 | S | 0 | $C_2H_5$ | $C_2H_5O$ | $i-C_4H_9$ | $CH_3$ | H | H | H | Yellow oil |
| 15 | S | 0 | $CH_3O$ | $CH_3O$ | phenyl | H | H | H | H | Semi-solid |
| 16 | 0 | 0 | $CH_3O$ | $CH_3S$ | $t-C_4H_9$ | H | H | H | H | Semi-solid |
| 17 | 0 | 0 | $CH_3O$ | $CH_3S$ | $i-C_3H_7$ | H | H | H | H | Viscous oil |
| 18 | S | 0 | $CH_3O$ | $CH_3O$ | $n-C_4H_9$ | H | H | H | H | Viscous oil |
| 19 | 0 | 0 | $CH_3O$ | $CH_3S$ | $n-C_4H_9$ | H | H | H | H | Viscous oil |
| 20 | S | 0 | $CH_3O$ | $CH_3O$ | $t-C_4H_9$ | H | H | H | H | 107.5-109 |
| 21 | 0 | 0 | $CH_3O$ | $CH_3S$ | $i-C_3H_7$ | $CH_3$ | H | H | H | Reddish brown oil |
| 22 | S | 0 | $CH_3O$ | $CH_3O$ | $C_2H_5$ | $CH_3$ | $CH_3$ | H | H | 1.5124 |
| 23 | 0 | 0 | $CH_3O$ | $CH_3S$ | $C_2H_5$ | $CH_3$ | $CH_3$ | H | H | Yellow (crude) |
| 24 | S | 0 | $C_2H_5$ | $C_2H_5O$ | $C_2H_5$ | $CH_3$ | $CH_3$ | H | H | 1.5022 |
| 25 | 0 | 0 | $C_2H_5$ | $CH_3S$ | $C_2H_5$ | $CH_3$ | $CH_3$ | H | H | Yellow oil (crude) |
| 26 | S | 0 | $CH_3O$ | $CH_3O$ | $i-C_3H_7$ | $CH_3$ | H | H | H | 1.5166 |
| 27 | 0 | 0 | $CH_3O$ | $C_2H_5$ | $C_2H_5$ | $CH_3$ | H | H | H | 1.5150 |
| 28 | 0 | 0 | $CH_3O$ | $n-C_3H_7S$ | $C_2H_5$ | $CH_3$ | H | H | H | 1.5011 |

TABLE I—Continued

| Compound Number | X | Y | $R_1$ | $R_2$ | $R_3$ | $R_4$ | $R_5$ | $R_6$ | $R_7$ | $n_D^{30}$ or melting point °C |
|---|---|---|---|---|---|---|---|---|---|---|
| 29 | O | O | $CH_3O$ | $i\text{-}C_3H_7S$ | $C_2H_5$ | $CH_3$ | H | H | H | 1.5038 |
| 30 | O | O | $CH_3O$ | $n\text{-}C_4H_9S$ | $C_2H_5$ | $CH_3$ | H | H | H | 1.5027 |
| 31 | S | O | $C_2H_5O$ | $C_2H_5S$ | $C_2H_5$ | $CH_3$ | H | H | H | 1.5139 |
| 32 | S | O | $C_2H_5O$ | pCl-phenyl-S | $C_2H_5$ | $CH_3$ | H | H | H | 1.5753 |
| 33 | S | O | $C_2H_5O$ | $CH_3S$ | $C_2H_5$ | $CH_3$ | H | H | H | 1.5386 |
| 34 | S | O | $C_2H_5O$ | p-$NO_2$phenyl-O | $C_2H_5$ | $CH_3$ | H | H | H | 1.5358 |
| 35 | S | O | $C_2H_5O$ | $n\text{-}C_3H_7S$ | $C_2H_5$ | $CH_3$ | H | H | H | 1.5280 |
| 36 | S | O | $C_2H_5O$ | $C_2H_5O$ | $C_2H_5$ | H | $CH_3$ | H | H | |
| 37 | S | O | $C_2H_5$ | $C_2H_5$ | $CH_3$ | H | H | H | H | 1.5563 |
| 38 | S | O | $CH_3O$ | $CH_3S$ | $C_2H_5$ | $CH_3$ | H | H | H | 1.5597 |
| 39 | S | O | $CH_3O$ | pCl-phenyl-S | $C_2H_5$ | $CH_3$ | H | H | H | 1.6163 |
| 40 | S | O | $CH_3O$ | $C_2H_5S$ | $C_2H_5$ | $CH_3$ | H | H | H | 1.5490 |
| 41 | S | O | $CH_3O$ | p-$NO_2$phenyl-O | $C_2H_5$ | $CH_3$ | H | H | H | 1.5633 |
| 42 | S | O | $CH_3O$ | $n\text{-}C_3H_7S$ | $C_2H_5$ | $CH_3$ | H | H | H | 1.5524 |
| 43 | S | O | $CH_3O$ | $n\text{-}C_4H_9S$ | $C_2H_5$ | $CH_3$ | H | H | H | 1.5390 |
| 44 | S | O | $CH_3O$ | $CH_3O$ | $C_2H_5$ | H | H | H | $i\text{-}C_3H_7$ | 1.5141 (L) |
| 45 | O | O | $CH_3O$ | $CH_3S$ | $C_2H_5$ | H | H | H | $i\text{-}C_3H_7$ | 1.5178 (L) |
| 46 | S | O | $CH_3O$ | $CH_3O$ | $C_2H_5$ | H | H | H | $i\text{-}C_4H_9$ | 69.5-71.5 (L) |
| 47 | O | O | $CH_3O$ | $CH_3S$ | $C_2H_5$ | H | H | H | $i\text{-}C_4H_9$ | 1.5142 (L) |
| 48 | S | O | $CH_3O$ | $CH_3O$ | $C_2H_5$ | H | H | H | $CH_3$ | 1.5172 (L) |
| 49 | S | O | $CH_3O$ | $CH_3S$ | $C_2H_5$ | H | H | H | $CH_3$ | 1.5260 (L) |
| 50 | S | O | $CH_3O$ | $CH_3O$ | $C_2H_5$ | H | H | H | $CH_3$ | Semi-solid (D) |
| 51 | O | O | $CH_3O$ | $CH_3S$ | $C_2H_5$ | H | H | H | $CH_3$ | 1.5265 (D) |
| 52 | O | O | $CH_3S$ | $CH_3S$ | $C_2H_5$ | $CH_3$ | H | H | H | 1.5277 |
| 53 | O | O | $CH_3S$ | $C_2H_5S$ | $C_2H_5$ | $CH_3$ | H | H | H | 1.5384 |
| 54 | O | O | $CH_3S$ | $(CH_3)_2CHO$ | $C_2H_5$ | $CH_3$ | H | H | H | 1.4995 |
| 55 | O | O | $CH_3S$ | $n\text{-}C_3H_7O$ | $C_2H_5$ | $CH_3$ | H | H | H | 1.5207 |
| 56 | O | O | $CH_3S$ | $s\text{-}C_4H_9O$ | $C_2H_5$ | $CH_3$ | H | H | H | 1.5015 |
| 57 | S | O | $C_2H_5$ | $C_2H_5O$ | $CH_3$ | H | H | H | H | 1.5296 |
| 58 | O | O | $CH_3S$ | $EtO\overset{O}{C}CH_2S$ | $C_2H_5$ | $CH_3$ | H | H | H | 1.5238 |
| 59 | O | O | $CH_3S$ | $CH_2=CHCH_2S$ | $C_2H_5$ | $CH_3$ | H | H | H | 1.5607 |
| 60 | S | O | $CH_3O$ | $CH_3O$ | $CH_2=CHCH_2\text{-}$ | $CH_3$ | $CH_3$ | H | H | 1.5097 |
| 61 | O | O | $CH_3O$ | $CH_3S$ | $CH_2=CHCH_2\text{-}$ | $CH_3$ | $CH_3$ | H | H | Reddish brown oil |
| 62 | S | O | $CH_3O$ | $CH_3O$ | phenyl$CH_2$ | $CH_3$ | H | H | H | 48-57.5 |
| 63 | O | O | $CH_3O$ | $CH_3S$ | phenyl$CH_2$ | $CH_3$ | H | H | H | Viscous Yellow oil |
| 64 | S | O | $CH_3O$ | $CH_3O$ | $CH_3$ | H | H | H | H | 1.5269 |
| 65 | O | O | $CH_3O$ | $CH_3S$ | $CH_3$ | H | H | H | H | 1.5339 |
| 66 | S | O | $CH_3O$ | $CH_3O$ | $C_2H_5$ | $CH_2=CH\text{-}$ | H | H | H | 1.5265 |

TABLE I—Continued

| Compound Number | X | Y | $R_1$ | $R_2$ | $R_3$ | $R_4$ | $R_5$ | $R_6$ | $R_7$ | $n_D^{30}$ or melting |
|---|---|---|---|---|---|---|---|---|---|---|
| 67 | O | O | $CH_3O$ | $CH_3S$ | $C_2H_5$ | $CH_2=CH-$ | H | H | H | 1.5304 |
| 68 | O | O | $CH_3S$ | $CH_2Cl$ | $CH_2CH=CH_2$ | $CH_3$ | H | H | H | 1.5331 |
| 69 | O | O | $CH_3O$ | $CH_2Cl$ | $C_2H_5$ | $CH_3$ | H | H | H | 1.5018 |
| 70 | O | O | $CH_3S$ | $p-NO_2$phenyl-O | $C_2H_5$ | $CH_3$ | H | H | H | 1.5675 |
| 71 | O | O | $CH_3S$ | $p-NO_2$phenyl-$CH_2O$ | $C_2H_5$ | $CH_3$ | H | H | H | 1.5720 |
| 72 | O | O | $CH_3S$ | 2,4,6-$Cl_3$phenyl-O | $C_2H_5$ | $CH_3$ | H | H | H | 1.5694 |
| 73 | O | O | $CH_3S$ | $p-CH_3S$-phenyl-O | $C_2H_5$ | $CH_3$ | H | H | H | 1.5835 |
| 74 | O | O | $CH_3S$ | $p$-CN-phenyl-O | $C_2H_5$ | $CH_3$ | H | H | H | 1.5592 |
| 75 | O | O | $CH_3S$ | $p-C(CH_3)_3$phenyl-O | $C_2H_5$ | $CH_3$ | H | H | H | 1.5436 |
| 76 | O | O | $CH_3S$ | 2,4-$Cl_2$phenyl-O | $C_2H_5$ | $CH_3$ | H | H | H | 1.5608 |
| 77 | O | O | $CH_3S$ | $p$-Cl-phenyl-O | $C_2H_5$ | $CH_3$ | H | H | H | 1.5966 |
| 78 | S | O | $CH_3O$ | $CH_3O$ | $C_2H_5$ | $CH_3$ | H | $CH_3$ | H | 1.5187 (Cis) |
| 79 | O | O | $CH_3O$ | $CH_3S$ | $C_2H_5$ | $CH_3$ | H | $CH_3$ | H | 1.5250 (Cis) |
| 80 | S | O | $CH_3O$ | $CH_3O$ | $C_2H_5$ | $CH_3$ | H | $CH_3$ | H | 1.5154 (Trans) |
| 81 | O | O | $CH_3O$ | $CH_3S$ | $C_2H_5$ | $CH_3$ | H | $CH_3$ | H | 1.5227 (Trans) |
| 82 | O | O | $ClCH_2$ | $C_2H_5S$ | $C_2H_5$ | H | H | H | H | 1.5375 |
| 83 | O | S | $CH_3O$ | $CH_3O$ | $CH_3$ | H | H | H | H | 88-91 |
| 84 | O | S | $CH_3S$ | $CH_3O$ | $CH_3$ | H | H | H | H | Liquid |
| 85 | S | S | $CH_3O$ | $C_2H_5$ | H | H | H | H | H | Semi-solid |
| 86 | O | S | $CH_3S$ | $CH_3O$ | $C_2H_5$ | H | H | H | H | Liquid |
| 87 | S | S | $CH_3O$ | $CH_3O$ | $CH_2CH=CH_2$ | H | H | H | H | Liquid |
| 88 | O | S | $CH_3S$ | $CH_3O$ | $CH_2CH=CH_2$ | H | H | H | H | Liquid |
| 89 | O | S | $CH_3O$ | $CH_3O$ | $CH_2-C(CH_3)=CH_2$ | H | H | H | H | 1.5560 |
| 90 | O | S | $CH_3S$ | $CH_3O$ | $CH_2-C(CH_3)=CH_2$ | H | H | H | H | 1.5175 |
| 91 | S | S | $CH_3O$ | $CH_3O$ | $CH_2CH_2CH_3$ | H | H | H | H | Liquid |
| 92 | O | S | $CH_3S$ | $CH_3O$ | $CH_2CH_2CH_3$ | H | H | H | H | Liquid |
| 93 | S | S | $CH_3O$ | $CH_3O$ | $C_5H_{11}$ | H | H | H | H | Liquid |
| 94 | O | S | $CH_3S$ | $CH_3O$ | $C_5H_{11}$ | H | H | H | H | Liquid |
| 95 | S | S | $CH_3O$ | $CH_3O$ | $CH_2CH=CCl_2$ | H | H | H | H | Liquid |
| 96 | O | S | $CH_3O$ | $CH_3O$ | $CH_2CH=CCl_2$ | H | H | H | H | Liquid |
| 97 | S | S | $CH_3O$ | $CH_3O$ | $CH_2CH=C(CH_3)_2$ | H | H | H | H | Liquid |
| 98 | O | S | $CH_3O$ | $CH_3O$ | $CH_2CH=C(CH_3)_2$ | H | H | H | H | Liquid |
| 99 | S | S | $CH_3O$ | $CH_3O$ | $CH_2CH=CClCH_3$ | H | H | H | H | Liquid |
| 100 | O | S | $CH_3S$ | $CH_3O$ | $CH_2CH=CClCH_3$ | H | H | H | H | Liquid |

TABLE I—Continued

| Compound Number | X | Y | $R_1$ | $R_2$ | $R_3$ | $R_4$ | $R_5$ | $R_6$ | $R_7$ | $n_D^{30}$ or melting point °C |
|---|---|---|---|---|---|---|---|---|---|---|
| 101 | S | S | $CH_3O$ | $CH_3O$ | $CH_2C\equiv CH$ | H | H | H | H | Liquid |
| 102 | O | S | $CH_3S$ | $CH_3O$ | $CH_2C\equiv CH$ | H | H | H | H | Liquid |
| 103 | S | S | $CH_3O$ | $CH_3O$ | $C_4H_9$ | H | H | H | H | Liquid |
| 104 | O | S | $CH_3S$ | $CH_3O$ | $C_4H_9$ | H | H | H | H | Liquid |
| 105 | S | S | $CH_2CH_3$ | $CH_3CH_2O$ | $CH_3$ | H | H | H | H | Liquid |
| 106 | O | S | $CH_2CH_3$ | $CH_3S$ | $CH_3$ | H | H | H | H | Liquid |
| 107 | O | S | $CH_3CH_2O$ | $CH_3CH_2O$ | $CH_3$ | H | H | H | H | Liquid |

1B wherein Q is $-CH_2CH_2CH_2-$

| Compound Number | X | Y | $R_1$ | $R_2$ | $R_3$ | $n_D^{30}$ or melting point °C |
|---|---|---|---|---|---|---|
| 108 | S | O | $CH_3O$ | $CH_3O$ | $C_2H_5$ | Low melting solid |
| 109 | S | O | $CH_3O$ | $CH_3O$ | $CH_2CH=CH_2$ | Low melting solid |
| 110 | O | O | $CH_3O$ | $CH_3S$ | $i-C_3H_7$ | Viscous oil |
| 111 | O | O | $CH_3O$ | $CH_3S$ | $CH_2CH=CH_2$ | Yellow oil |
| 112 | O | O | $CH_3O$ | $CH_3S$ | $C_2H_5$ | Viscous oil |
| 113 | S | O | $CH_3O$ | $CH_3O$ | $i-C_3H_7$ | 99-102 |

Systemic Evaluation Test

This test evaluates the systemic toxicity by root absorption and upward translocation of the candidate systemic compound. The two-spotted mite, *Tetranychus urticae* (Koch) and the bean aphid, *Aphis fabae* (Scop.), are employed in tests for systemic activity. Young pinto bean plants in the primary leaf stage are used as host plants for the two-spotted mite. The pinto bean plants are placed in bottles containing 200 ml. of the test solution and held in place with cotton plugs. Only the roots are immersed. The solutions are prepared by dissolving the compounds to be tested in a suitable solvent, usually acetone, and then diluting with distilled water. The final acetone concentration never exceeds about 1%. Immediately after the plants are placed in the test solution, they are infested with the test species. Mortalities are determined after seven days. The percentage kill is determined by comparison with control plants which are placed in distilled water only. The LD-50 value is calculated using well-known procedures. LD-50 values for the two-spotted mite are found in Table II under column 2SM-SYS; and for bean aphid under column BAS.

Young nasturtium plants (*Tropaeolum sp.*) are used as the host plants for the bean aphid. The host plants are transplanted into one pound of soil that has been treated with the candidate compound. Immediately after planting in the treated soil the plants are infested with the aphids. Concentrations of toxicants in the soil ranged from 10 ppm per pound of soil downward until an LD-50 value is obtained. Mortality is recorded after 72 hours. Comparison is made with control plants placed in untreated soil.

Insecticidal Evaluation Tests

The following insect species are subjected to evaluation tests for insecticidal activity.

(1) Housefly (HF) — *Musca domestica* (Linn.)
(2) Lygus Bug (LB) — *Lygus Hesperus* (Knight)

Aliquots of the toxicants, dissolved in an appropriate solvent, are diluted in water containing 0.002% of a wetting agent, Sponto 221 — (a polyoxyether of alkylated phenols blended with organic sulfonates). Test concentrations ranged from 0.05% downward to that at which 50% mortality is obtained. In the tests, for these species, 10 one-month old nymphs of the Lygus Bug are placed in a circular cardboard cage sealed on one end with cellophane and covered by a cloth netting on the other. Test concentrations for the Lygus Bug ranged from 0.05% downward to that at which 50% mortality was obtained. Each of the aqueous suspensions of the candidate compounds are sprayed onto the insects through the cloth netting by means of a hand spray gun. Percent mortality in each case is recorded after 72 hours, and the LD-50 values expressed as percent of toxicant in the aqueous spray are recorded. The results are in Table II under Column LB.

The following procedure is used to test houseflies. A stock solution containing 0.1 percent by weight of the toxicant in an appropriate solvent is prepared. Aliquots of this solution are combined with 1 milliliter of an acetone-peanut oil solution in a glass Petri dish and allowed to dry. The aliquots are selected to achieve desired toxicant concentration ranging from 100 mg per Petri dish to that at which 50% mortality was attained. The Petri dishes are placed in a circular cardboard cage, closed on the bottom with cellophane and covered on top with cloth netting. Twenty-five female houseflies are introduced into the cage and the percent mortality is recorded after 48 hours. The LD-50 values are expressed in terms of percent concentration or $\mu$g per 25 female flies. LD-50 values obtained in the above-mentioned housefly test are found in Table II under Column HF.

Systemic Test: Salt-Marsh Caterpillar — Estigmene acrea (Drury)

Aliquots of the toxicant dissolved in appropriate solvent are diluted in water and placed in glass bottles. Concentrations of active ingredient range from 10 ppm to that at which 50% mortality is obtained. Kidney beans (*Phaseolus vulgaris*), supported by cotton plugs, are inserted into the solution so that the roots and major portion of the stem are completely immersed. Salt-marsh caterpillar egg masses (10 to 30 eggs) on small pieces of tissue paper are pinned to the kidney bean leaves and allowed to hatch. Mortality is recorded after five days and the $LD_{50}$ values are expressed as parts per million (ppm) of toxicant in the aqueous solution. The values are found in Table II under the Column SMC-Sys.

The compounds are also active against two-spotted mite (2-SM) (*Tetranychus urticae* (Koch.)). Lima bean plants (*Phaseolus* sp.) are utilized as the host plant and infested with 50 to 75 mites of various ages. Twenty-four hours after infestation they are sprayed to the point of run off with aqueous suspension of the toxicant. Test concentrations range from 0.05% to that at which 50% mortality is obtained. The values obtained in this test are found in Table II under the Columns 2SM-PE and 2SM-Eggs.

The compounds are also active against bean aphid (*Aphis fabae* (Scop.)) as a contact toxicant. The same test procedure as given for the two-spotted mite above is used for the bean aphids except nasturtium (*Tropaeolum sp.*) plants approximately 2 to 3 inches tall are used as the host plant. The LD-50 values obtained for the compounds of this invention are found in Table II under Column BA.

As previously mentioned, the herein described compounds produced in the above described manner are phytotoxic compounds which are useful and valuable in controlling various plant species. Compounds of this invention are tested as herbicides in the following manner.

Pre-emergence herbicide test

On the day preceding treatment, seeds of seven different weed species are planted in individual rows using one species per row across the width of the flat. The seeds used are hairy crabgrass (*Digitaria sanguinatis* (L.) Scop.), yellow foxtail (*Setaria glauca* (L.) Beauv.), watergrass (*Echinochloa crusgalli* (L.) Beauv.), wild oats (*Avena fatua* (L.)), redroot pigweed (*Amaranthus retroflexus* (L.)), Indian mustard (*Brassica juncea* (L.) Coss.) and curly dock (*Rumex crispus* (L.)). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent such as acetone containing 1% Tween 20 (polyoxy-ethylene sorbitan monolaurate) and diluting with a small amount of water. The following day each flat is sprayed at the rate of 20 pounds of the candidate compound per 80 gallons of solution per acre. An atomizer is used to spray the solution on the soil surface. The flats are placed in a greenhouse at 80°F. and watered regularly. Two weeds later the degree of weed control is determined by comparing the amount of germination and growth of each weed in the treated flats with weeds in several untreated control flats. The rating system is as follows:

TABLE II

INSECTICIDAL EVALUATION RESULTS
LD-50 VALUES

| Compound Number | HF (ug/25♀) | LB (%) | BA (%) | BAS (ppm) | SMC SYS (ppm) | 2-SM PE (%) | 2-SM Eggs (%) | 2-SM SYS (ppm) |
|---|---|---|---|---|---|---|---|---|
| 1 | 3.0 | .0003 | .00008 | .008 | 1–3 | .00008 | .003 | .08 |
| 2 | 10.0 | .0008 | .0003 | .03 | | .0003 | .0008 | .3 |
| 3 | 45.0 | .0008 | .0005 | .05 | | .0008 | .003 | .4 |
| 4 | 5.5 | .00005 | .0001 | .008 | .8 | .00005 | | .03 |
| 5 | 85.0 | .01 | .05 | 5.0 | | .005 | .03 | 3.0 |
| 6 | 40.0 | .0005 | .001 | .3 | >10.0 | .003 | .003 | .08 |
| 7 | 40.0 | .0003 | .0003 | .1 | >10.0 | .0008 | .003 | .08 |
| 8 | 30.0 | .0005 | .0005 | .3 | 8.0 | .0005 | .003 | .1 |
| 9 | 55.0 | .05 | .01 | 3.0 | | .03 | .03 | 10.0 |
| 10 | 7.5 | .0003 | .0003 | .08 | 3.0 | .0003 | .0008 | .03 |
| 11 | 65.0 | .01 | .03 | >10.0 | | .003 | .003 | 3.0 |
| 12 | 18.0 | .001 | .005 | 8.0 | 8.0 | .0008 | .003 | .3 |
| 13 | 14.0 | .0008 | .003 | 3.0 | >10.0 | .0003 | .0003 | .02 |
| 14 | 90.0 | .05 | .03 | >10.0 | | .01 | >.05 | >10.0 |
| 15 | >100.0 | | >.05 | | | >.05 | >.05 | |
| 16 | >100.0 | .005 | .03 | 8.0 | >10.0 | .005 | .03 | 3.0 |
| 17 | 5.5 | .0003 | .0003 | .02 | | .00008 | .0001 | .04 |
| 18 | 70.0 | .03 | .01 | 8.0 | | >.05 | >.05 | >10.0 |
| 19 | 15.0 | .0008 | .001 | .5 | 3.0 | .0003 | .0003 | .2 |
| 20 | >100.0 | | >.05 | | | >.05 | >.05 | |
| 21 | 6.0 | .0005 | .0003 | .3 | >10.0 | .0008 | .0008 | .1 |
| 22 | 100.0 | .05 | .03 | 3.0 | | .03 | .03 | .8 |

TABLE II — Continued

INSECTICIDAL EVALUATION RESULTS
LD-50 VALUES

| Compound Number | HF (ug/25 ♀) | LB (%) | BA (%) | BAS (ppm) | SMC SYS (ppm) | 2-SM PE (%) | 2-SM Eggs (%) | 2-SM SYS (ppm) |
|---|---|---|---|---|---|---|---|---|
| 23 | 18.0 | .0003 | .0008 | .3 | 8.0 | .0003 | .0008 | .1 |
| 24 | >100.0 | .03 | .03 | >10.0 | | >.05 | >.05 | >10.0 |
| 25 | 30.0 | .001 | .001 | .8 | >10.0 | .001 | .003 | .5 |
| 26 | >100.0 | .03 | .008 | 3.0 | | .03 | .03 | .5 |
| 27 | 30.0 | .001 | .003 | .3 | >10.0 | .003 | .003 | .3 |
| 28 | 40.0 | .008 | .003 | 1.0 | >10.0 | .03 | .03 | 3.0 |
| 29 | >100.0 | .03 | .03 | 3.0 | >10.0 | .05 | >.05 | 8.0 |
| 30 | >100.0 | >.05 | .03 | 8.0 | >10.0 | >.05 | >.05 | |
| 31 | >100.0 | .03 | .003 | 8.0 | | >.05 | >.05 | |
| 32 | >100.0 | >.05 | .003 | >10.0 | | >.05 | >.05 | |
| 33 | >100.0 | .003 | .003 | .8 | >10.0 | .005 | .03 | .8 |
| 34 | 100.0 | .003 | .003 | >10.0 | | .03 | .03 | >10.0 |
| 35 | 100.0 | .03 | .003 | >10.0 | | >.05 | >.05 | |
| 36 | | | | | | | | >10.0 |
| 37 | >100.0 | .05 | >.05 | | | >.05 | >.05 | |
| 38 | 30.0 | .003 | .0005 | .3 | 8.0 | .0008 | .003 | .3 |
| 39 | >100.0 | .03 | .008 | >10.0 | | >.05 | >.05 | |
| 40 | >100.0 | .05 | .005 | 3.0 | | .05 | >.05 | |
| 41 | >100.0 | .03 | .005 | >10.0 | | .03 | .03 | 5.0 |
| 42 | >100.0 | .01 | .005 | 3.0 | | .03 | .03 | 3.0 |
| 43 | >100.0 | .01 | .005 | >10.0 | | .03 | .03 | 3.0 |
| 44 | >100.0 | | >.05 | | | >.05 | >.05 | |
| 45 | >100.0 | .003 | >.05 | | | .03 | >.05 | >10.0 |
| 46 | >100.0 | | >.05 | | | >.05 | >.05 | |
| 47 | >100.0 | | >.05 | | | >.05 | >.05 | |
| 48 | 20.0 | .0001 | .0001 | .03 | 3.0 | .003 | .003 | .3 |
| 49 | 11.0 | .0001 | .0003 | .08 | 3.0 | .0008 | .0008 | .3 |
| 50 | 30.0 | .0008 | .0008 | .1 | 8.0 | .0008 | .0008 | .08 |
| 51 | 6.0 | .0003 | .00003 | .03 | 3.0 | .0003 | .0003 | .05 |
| 52 | 7.5 | .0005 | .0003 | .3 | 5.0 | .0001 | .0003 | .03 |
| 53 | 30.0 | .001 | .0008 | .5 | 10.0 | .0005 | .003 | .1 |
| 54 | 75.0 | .01 | .003 | 8.0 | >10.0 | .003 | .008 | 1.0 |
| 55 | 100.0 | .03 | .01 | 10.0 | | .01 | >.05 | 3.0 |
| 56 | >100.0 | .03 | .03 | >10.0 | | .005 | .03 | 3.0 |
| 57 | >100.0 | | >.05 | | | >.05 | >.05 | |
| 58 | 100.0 | .008 | .003 | >10.0 | | .003 | >.05 | >10.0 |
| 59 | 50.0 | .003 | .003 | 5.0 | 8.0 | .003 | .003 | .3 |
| 60 | >100.0 | .05 | >.05 | | | .003 | .03 | 3.0 |
| 61 | 30.0 | .01 | .03 | 1.0 | >10.0 | .0005 | .003 | .3 |
| 62 | >100.0 | >.05 | >.05 | | | .03 | .05 | 5.0 |
| 63 | 75.0 | .008 | >.05 | | | .005 | .03 | 1.0 |
| 64 | 3.7 | .001 | .0003 | .03 | 1.0 | .0008 | .0008 | .3 |
| 65 | 1.0 | .0001 | .00003 | .005 | .3 | .0003 | .0003 | .03 |
| 66 | >100.0 | | .05 | | | .01 | .03 | 3.0 |
| 67 | 15.0 | .001 | .003 | .08 | >10.0 | .0003 | .003 | .3 |
| 68 | 30.0 | .003 | .0005 | | 8.0 | .0008 | .008 | 1.0 |
| 69 | >100.0 | | >.05 | | | >.05 | >.05 | |
| 70 | 50.0 | .008 | .003 | 8.0 | 3.0 | .005 | .03 | 5.0 |
| 71 | >100.0 | | >.05 | | | >.05 | >.05 | |
| 72 | 40.0 | >.05 | .008 | >10.0 | | >.05 | >.05 | |
| 73 | 100.0 | .008 | .005 | 10.0 | >10.0 | .0008 | .008 | .8 |
| 74 | 100.0 | .03 | .003 | 10.0 | >10.0 | .005 | .03 | 3.0 |
| 75 | >100.0 | | >.05 | | | >.05 | >.05 | |
| 76 | 90.0 | .05 | .005 | >10.0 | | .005 | >.05 | >10.0 |
| 77 | >100.0 | .05 | .003 | >10.0 | | .003 | .03 | |
| 78 | 70.0 | .03 | .008 | .5 | | .003 | .03 | |
| 79 | 30.0 | .001 | .0008 | .3 | | .0008 | .001 | |
| 80 | 100.0 | .005 | .008 | 1.0 | | .003 | .03 | |
| 81 | 8.0 | .001 | .0003 | | | .0003 | .0008 | |
| 82 | 50.0 | .005 | .0003 | 1.0 | | .001 | .008 | |
| 83 | 100.0 | .03 | .008 | 3.0 | | .03 | >.05 | |
| 84 | 15.0 | .0001 | .0003 | .03 | 5.0 | .005 | .005 | 3.0 |
| 85 | 100.0 | .01 | .03 | 3.0 | | >.05 | >.05 | >10.0 |
| 86 | 20.0 | .0003 | .0008 | .3 | | .03 | .03 | 5.0 |
| 87 | >100.0 | >.05 | .05 | 3.0 | | >.05 | >.05 | >10.0 |
| 88 | 50.0 | .003 | .003 | .3 | | .05 | >.05 | 3.0 |
| 89 | 100.0 | .008 | .03 | >10.0 | | .03 | .03 | 3.0 |
| 90 | 40.0 | .0005 | .001 | .3 | >10.0 | .003 | .003 | .08 |
| 91 | 100.0 | .05 | >.05 | | | >.05 | >.05 | |
| 92 | 90.0 | .008 | .008 | 3.0 | >10.0 | .03 | .03 | 10.0 |
| 93 | 100.0 | >.05 | >.05 | | | >.05 | >.05 | |
| 94 | 80.0 | .03 | .03 | 8.0 | | >.05 | >.05 | >10.0 |
| 95 | 50.0 | .03 | .03 | 3.0 | >10.0 | >.05 | >.05 | 8.0 |
| 96 | 30.0 | .03 | .008 | 3.0 | .8 | .008 | >.05 | 8.0 |
| 97 | 30.0 | .03 | .03 | 8.0 | | .05 | >.05 | |
| 98 | 30.0 | .03 | .008 | 1.0 | 10.0 | .03 | .03 | 10.0 |
| 99 | 22.0 | .03 | .03 | 3.0 | >10.0 | .05 | >.05 | |
| 100 | 20.0 | .05 | .008 | 3.0 | 3.0 | .03 | >.05 | >10.0 |
| 101 | 30.0 | .05 | >.05 | | | >.05 | >.05 | |
| 102 | 30.0 | .01 | .003 | .8 | 3.0 | .003 | .008 | |
| 103 | 50.0 | >.05 | >.05 | | | >.05 | >.05 | |
| 104 | 40.0 | >.05 | .03 | 1.0 | | .05 | >.05 | |
| 105 | >100.0 | >.05 | .03 | >10.0 | | >.05 | >.05 | |
| 106 | | .001 | .0003 | .1 | 3.0 | .003 | .003 | .3 |
| 107 | >100.0 | >.05 | .03 | >10.0 | | >.05 | >.05 | |

TABLE II — Continued

INSECTICIDAL EVALUATION RESULTS
LD-50 VALUES

| Compound Number | HF (ug/25 ♀) | LB (%) | BA (%) | BAS (ppm) | SMC SYS (ppm) | 2-SM PE (%) | 2-SM Eggs (%) | 2-SM SYS (ppm) |
|---|---|---|---|---|---|---|---|---|
| 108 | <100.0 | .003 | .003 | .3 | .008 | .008 | 1.0 | |
| 109 | <100.0 | >.05 | .03 | 3.0 | | .03 | .05 | 3.0 |
| 110 | <100.0 | .003 | .003 | .3 | | .01 | .03 | .5 |
| 111 | <100.0 | .001 | .003 | .3 | | .005 | .008 | .5 |
| 112 | <100.0 | .0003 | .003 | .1 | | .001 | .003 | <.5 |
| 113 | >100.0 | | .05 | | | >.05 | | |

− = no significant injury (0–15 percent control)
+ = slight injury (25–35 percent control)
++ = moderate injury (55–65 percent control)
+++ = severe injury or death (85–100 percent control)

An activity index is used to represent the total activity on all seven weed species. It is the sum of the number of plus marks, so that an activity index of 21 represents complete control of all seven weeds.

Post-emergence herbicide test

Seeds of five weed species including hairy crabgrass, watergrass, wild oats, Indian mustard, and curly dock and one crop pinto beans (*Phaseolus vulgaris*), are planted in flats as described above for pre-emergence screening. The flats are placed in the greenhouse at 72°–85°F. and watered daily with a sprinkler. About 10 to 14 days after planting when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1% Tween 20 (polyoxy-ethylene sorbitan monolaurate) and then adding 5 ml. of water. The solution is sprayed on the foliage using an atomizer. The spray concentration is 0.5% and the rate would be approximately 20 lbs./acre if all of the spray were retained on the plant and the soil, but some spray is lost so it is estimated that the application rate is approximately 12.5 lbs./acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose taking care not to wet the foliage.

Injury rates are recorded 14 days after treatment. The rating system is the same as described above for the pre-emergence test where (−), (+), (++), and (+++) are used for the different rates of injury and control. The injury symptoms are also recorded. The maximum activity index for complete control of all the species in the post-emergence screening test is 18 which represents the sum of the plus marks obtained with the six plant species used in the test.

The concentration of a compound of the present invention constituting an effective amount and the best mode of administration to an insect or acarid pest or its habitat may be easily determined by those skilled in the art of pest control, as exemplified by the procedures described hereinabove. As shown above, the compounds of the present invention are also useful as pre-emergence or post-emergence herbicides, and can be applied in a variety of ways at various concentrations. In practice the compounds are formulated with an inert carrier utilizing methods well-known to those skilled in the art, thereby making them suitable for application as dusts, sprays, drenches and the like. The amount applied depends upon the nature of the seeds of plants to be controlled and the rate of application may vary from one to 50 lbs. per acre. One particularly advantageous way of applying the compound is as a narrow band along the row crop, straddling the row.

Various changes and modifications can be made without departing from the spirit and scope of the invention described herein as will be apparent to those skilled in the art to which it pertains. It is accordingly intended that the present invention shall only be limited by the scope of the claims.

What is claimed is:

1. A method for controlling pests selected from the group consisting of insects and acarids comprising applying to the pest habitat a pesticidally effective amount of a compound having the formula

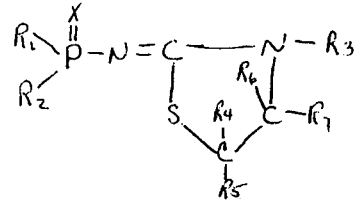

wherein X is oxygen or sulfur, $R_1$ is lower alkyl, lower alkoxy, or lower alkylthio; $R_2$ is lower alkyl, lower alkoxy, lower alkylthio, chloro lower alkyl, carbethoxy methylthio, allylthio, chlorophenylthio, nitrobenzyloxy, phenyl or substituted phenoxy in which said substituents are nitro, cyano, methylthio, chloro or tert.-butyl; $R_3$ is lower alkyl, benzyl, phenyl, lower alkoxyalkyl, alkenyl, having 3 to 5 carbon atoms, chloroalkenyl, having 3 to 4 carbon atoms, and 2-propynyl; $R_4$ is hydrogen, lower alkyl, cyclohexyl, or vinyl, $R_5$, $R_6$ and $R_7$ are independently hydrogen or lower alkyl.

2. The method of claim 1 in which X is oxygen, $R_1$ is lower alkylthio, $R_2$ is lower alkoxy, $R_3$ is lower alkyl, and $R_4$, $R_5$, $R_6$ and $R_7$ are each hydrogen.

3. The method of claim 2 in which $R_1$ is methylthio, $R_2$ is methoxy and $R_3$ is methyl.

4. The method of claim 2 in which $R_1$ is methylthio, $R_2$ is methoxy and $R_3$ is ethyl.

5. The method of claim 2 in which $R_1$ is methylthio, $R_2$ is methoxy and $R_3$ is propyl.

6. The method of claim 2 in which $R_1$ is methylthio, $R_2$ is methoxy and $R_3$ is pentyl.

7. The method of claim 1 in which X is oxygen, $R_1$ is lower alkylthio, $R_2$ is lower alkoxy, $R_3$ is chloroalkenyl and $R_4$, $R_5$, $R_6$, and $R_7$ are each hydrogen.

8. The method of claim 7 in which $R_1$ is methylthio, $R_2$ is methoxy, $R_3$ is $CH_2CH=CCl_2$.

9. The method of claim 7 in which $R_1$ is methylthio, $R_2$ is methoxy, $R_3$ is $CH_2CH=CClCH_3$.

10. The method of claim 1 in which X is oxygen, $R_1$ is lower alkylthio, $R_2$ is lower alkoxy, $R_3$ is 2-propynyl and $R_4$, $R_5$, $R_6$, and $R_7$ are each hydrogen.

11. The method of claim 10 in which $R_1$ is methylthio and $R_2$ is methoxy.

12. The method of claim 1 in which X is oxygen, $R_1$ is lower alkyl, $R_2$ is lower alkylthio, $R_3$ is lower alkyl, and $R_4$, $R_5$, $R_6$ and $R_7$ are each hydrogen.

13. The method of claim 12 in which $R_1$ is ethyl, $R_2$ is methylthio, $R_3$ is methyl.

* * * * *